United States Patent
Allouche

(10) Patent No.: US 7,215,800 B2
(45) Date of Patent: May 8, 2007

(54) FOLLOWING THE DEFORMATION OF A STRUCTURE PER UNIT LENGTH DEFINED ON AN IMAGE OF A SEQUENCE OF IMAGES OF AN ORGAN WHICH IS DEFORMABLE OVER TIME

(75) Inventor: Cyril Allouche, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 351 days.

(21) Appl. No.: 10/055,389

(22) Filed: Jan. 23, 2002

(65) Prior Publication Data
US 2002/0146158 A1    Oct. 10, 2002

(30) Foreign Application Priority Data
Jan. 23, 2001   (FR) .................................. 01 00883

(51) Int. Cl.
*G06K 9/00* (2006.01)
(52) U.S. Cl. ........................ 382/128; 382/131
(58) Field of Classification Search ................ 382/128, 382/131, 228, 226, 203, 173; 128/922; 250/363.04; 356/39; 377/10
See application file for complete search history.

(56) References Cited

U.S. PATENT DOCUMENTS 5,820,561 A * 10/1998 Olstad et al. ................ 600/453

2002/0146158 A1* 10/2002 Allouche ..................... 382/128
2002/0176637 A1* 11/2002 Allouche ..................... 382/288
2003/0048267 A1*  3/2003 Allouche ..................... 345/419
2004/0002646 A1*  1/2004 Oesingmann ............... 600/410

FOREIGN PATENT DOCUMENTS

WO         0048509        8/2000

OTHER PUBLICATIONS

"Quantification of the Local Heartwall Motion by Magnetic Resonance Myocardial Tagging", by M. Stuber et al, Computerized Medical Imaging and Graphics 22 (1998) 217-228.
European Application No. 00403028.4, filed Oct. 31, 2000.

* cited by examiner

*Primary Examiner*—Duy M. Dang

(57) ABSTRACT

The invention includes processing an image belonging to a sequence of at least two images displaying a surface representing an organ or part of an organ which is deformable over time and called the organ surface. The organ surface includes characteristic points (marking points) which correspond to each other from one image to another in the sequence. The method includes defining a structure per unit length whose deformation is followed on an image, calculating the positions of the marking points and determining the parameters of a mathematical expression of the deformation of the organ observed between the two images. The determination is carried out from positions of a set of marking points on the two images. The expression is applied to the structure per unit length to define the form of the structure per unit length after deformation of the organ between the two images.

13 Claims, 4 Drawing Sheets

Figure 1:
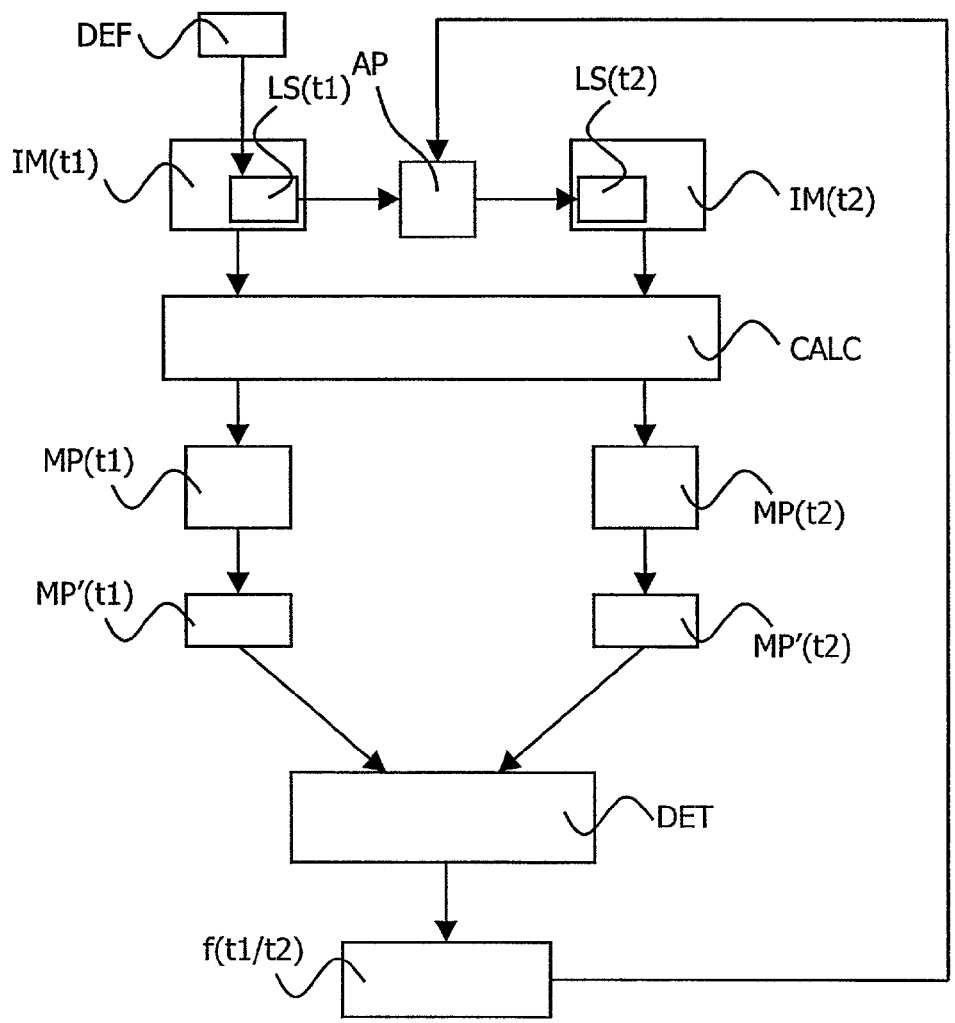

FOLLOWING THE DEFORMATION OF A STRUCTURE PER UNIT LENGTH DEFINED ON AN IMAGE OF A SEQUENCE OF IMAGES OF AN ORGAN WHICH IS DEFORMABLE OVER TIME

BACKGROUND OF THE INVENTION

The invention relates to an image processing method belonging to a sequence of at least two images having a surface representing an organ or a part of an organ which is deformable over time and referred to as an organ surface, said surface including characteristic points, denoted marking points, which correspond to each other from one image to another in the sequence. This invention also relates to an image processing apparatus for implementing the method described above.

The invention finds its application in the field of medical image processing. The method is in particular applicable to organ images marked by magnetic resonance spatial modulation. This marking is visible on the images in the form of marking lines with points of intersection. The marking lines deform following the deformation of the organ. Said intersection points are then chosen as marking points since the matches between these points from one image to another are easily detectable.

An organ image processing method marked by magnetic modulation with a view to quantifying the deformation of the organ is already known from the state of the art through the publication by Matthias Stuber et al. entitled "Quantification of the local heartwall motion by magnetic resonance myocardial tagging". In this document, the points of intersection between the marking lines are determined by approximation algorithms based on a calculation of potential ("snakes"). In addition, this method uses a mean of the angles with respect to the center of gravity in order to quantify the rotation and contraction.

This method has drawbacks. First of all, the use of approximation algorithms based on a calculation of potential for determining the points of intersection between the marking lines lacks precision. Then the use of the mean of the angles with respect to the center of gravity for quantifying the rotation and contraction also leads to a result which is imprecise and mathematically incorrect. Consequently subsequent extrapolations are not reliable for the points other than the marking points. However, such extrapolations are necessary when it is wished to follow the movement of a particular structure per unit length which is defined on an image and which is made to deform with the organ in the sequence of images.

SUMMARY OF THE INVENTION

One aim of the invention is to provide a method of studying the deformation of an organ from data of the image on a structure per unit length defined on an image of the sequence. A particular aim of the invention is to provide a method of following, reliably, the deformation of such a structure per unit length defined on an image. Following a structure per unit length is in particular advantageous for studying the movement of the walls of the organ which appear on the image in the form of a contour. The invention applies particularly to the heart, which has two major walls visible in the images, for example obtained by magnetic resonance: the endocardium and the epicardium.

According to the invention, the aims cited are achieved, and the problems presented by the state of the art are resolved, by a method according to the introductory paragraph and characterized in that it comprises steps of:

- defining a structure per unit length on one of the images of the sequence,
- calculating the positions of the marking points on at least two images, successive or not,
- determining the parameters of an explicit mathematical expression of the deformation of the organ or part of the organ observed between the two images, from the positions of a set of marking points on the two images and the positions of the points of the linear structure,
- applying said explicit mathematical expression to the structure per unit length in order to define the form of the structure per unit length after deformation of the organ between the two images.

The method according to the invention has many advantages amongst which are the advantages of regularization by an explicit mathematical expression in order to quantify the deformation. This regularization replaces the approximation by extrapolation of the movement at each point which is the chosen method in the document of the prior art cited. The mathematical expression obtained is then at least valid at any point on the structure per unit length defined during the first step. This approximation estimates a movement in the very rigorous sense of least squares with an explicit mathematical regularization. This regularization corrects the noise.

In an advantageous implementation of the invention, the structure per unit length effects a segmentation of the image, said segmentation thus being followed from one image to another. The structure per unit length defines several zones in the image and the calculations of the deformation of the organ can then be performed solely on a particular zone of interest. For example, in the case of the heart, the definition of two linear structures following respectively the endocardium and the epicardium makes it possible to perform the calculations only on the surface of the image actually representative of the organ. This reduces the calculation times and makes the result more reliable since the "stray" movements of the structures not belonging to the organ are not taken into account.

In a first embodiment of the invention, the mathematical expression of the deformation of the organ or of the part of the organ observed between the two images is determined for a surface including the structure per unit length from positions on the two images of a set of marking points which contains at least the marking points present on said surface. The structure per unit length can be included strictly in the surface or be the contour of this surface.

In a second embodiment, the mathematical expression of the deformation of the organ or of the part of the organ observed between the two images is determined solely for the points on the structure per unit length from positions on the two images of a set of marking points which are weighted according to their distance with respect to the linear structure. The weights allocated to the marking points are greater, the closer the point is to the linear structure. This weight, used in a least squares approximation, can make it possible to obtain a very reliable mathematical expression for the points on the structure per unit length where it is defined.

BRIEF DESCRIPTION OF THE DRAWING FIGURES

Figure 2:
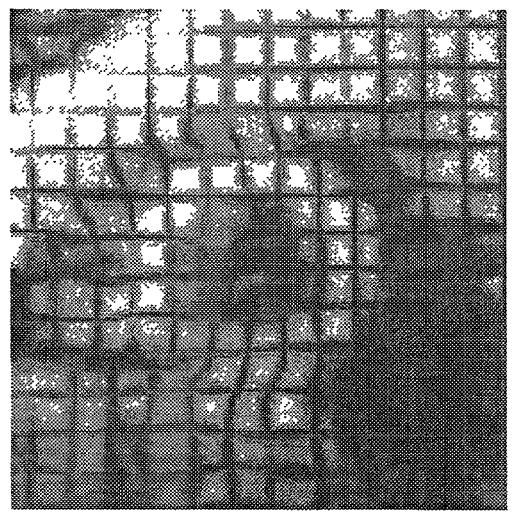
Figure 3:
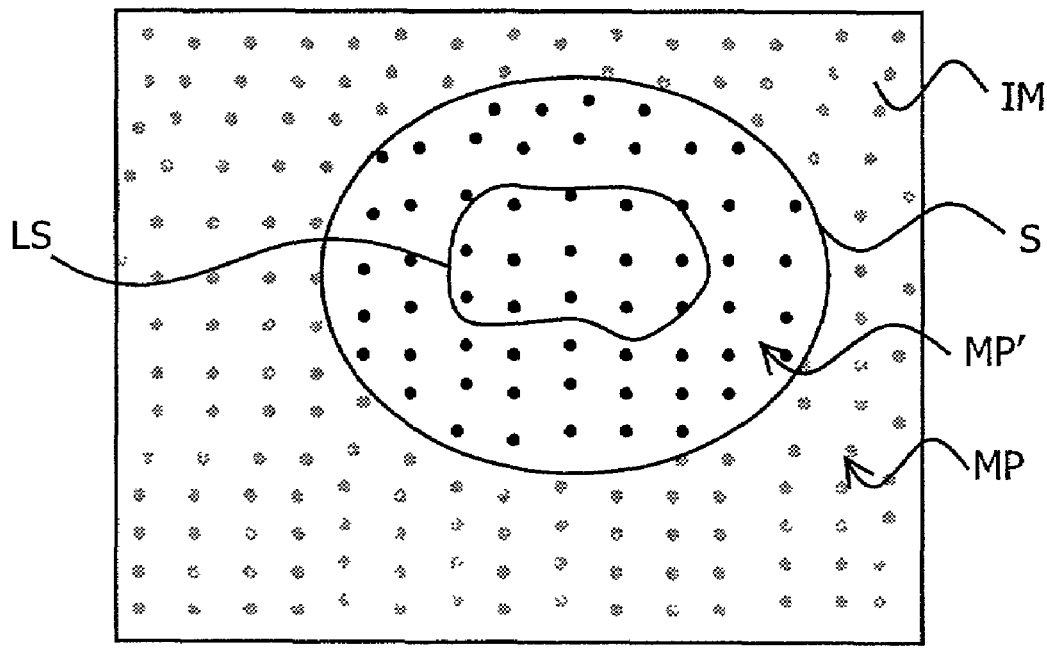
Figure 4:
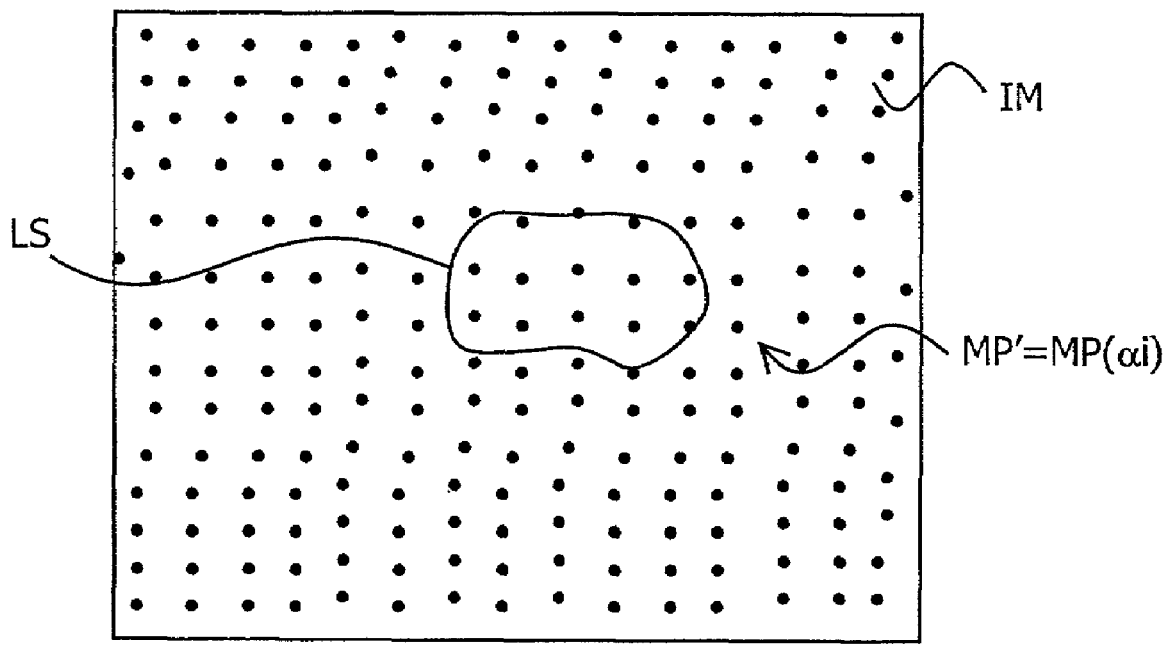
Figure 5:
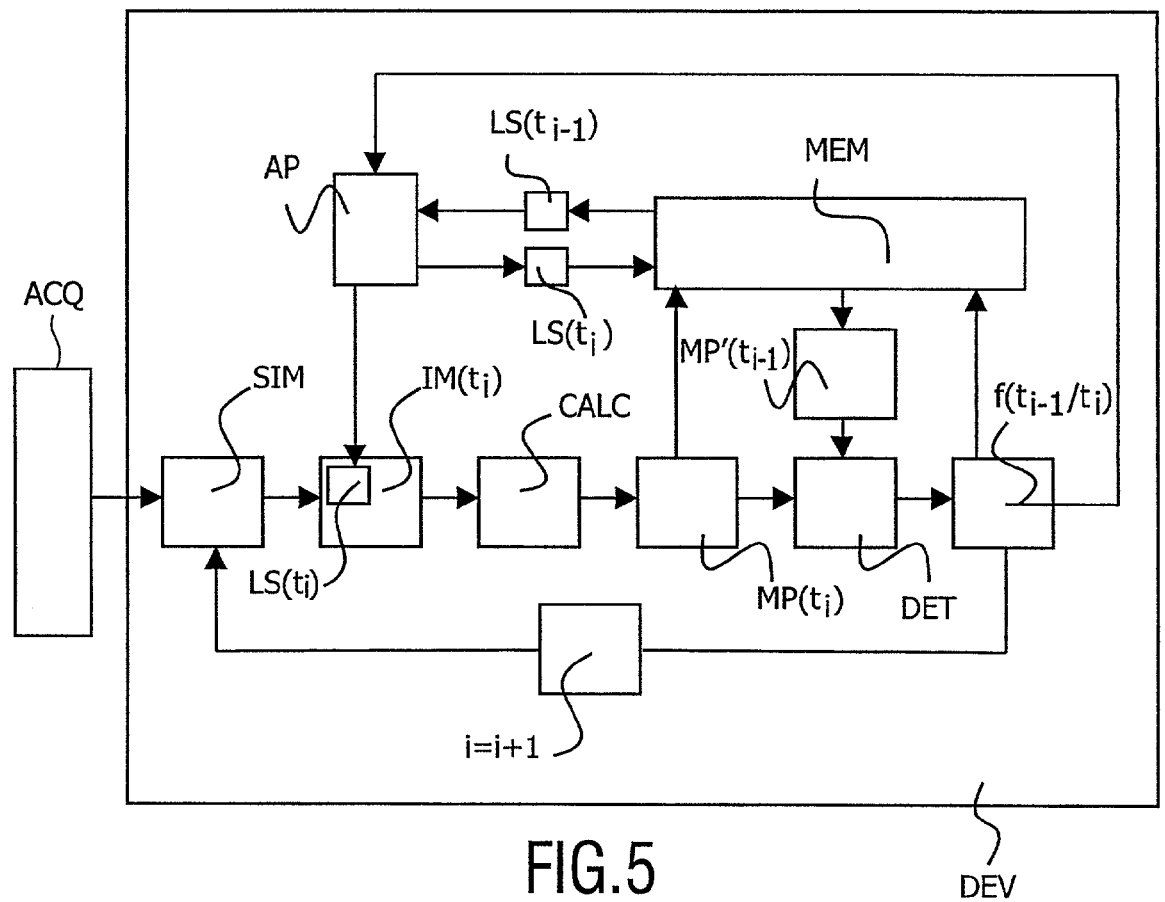
Figure 6A:
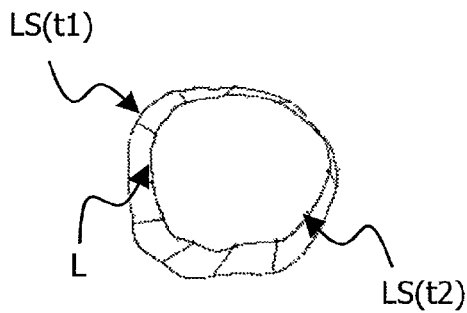
Figure 6B:
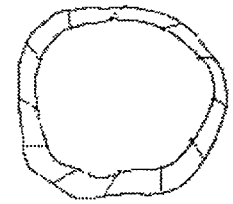
Figure 6C:
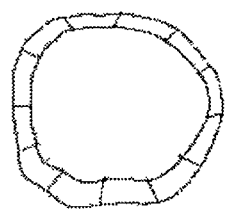
Figure 6D:
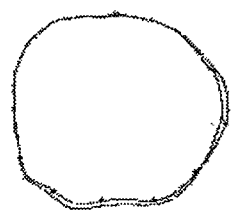
Figure 7:
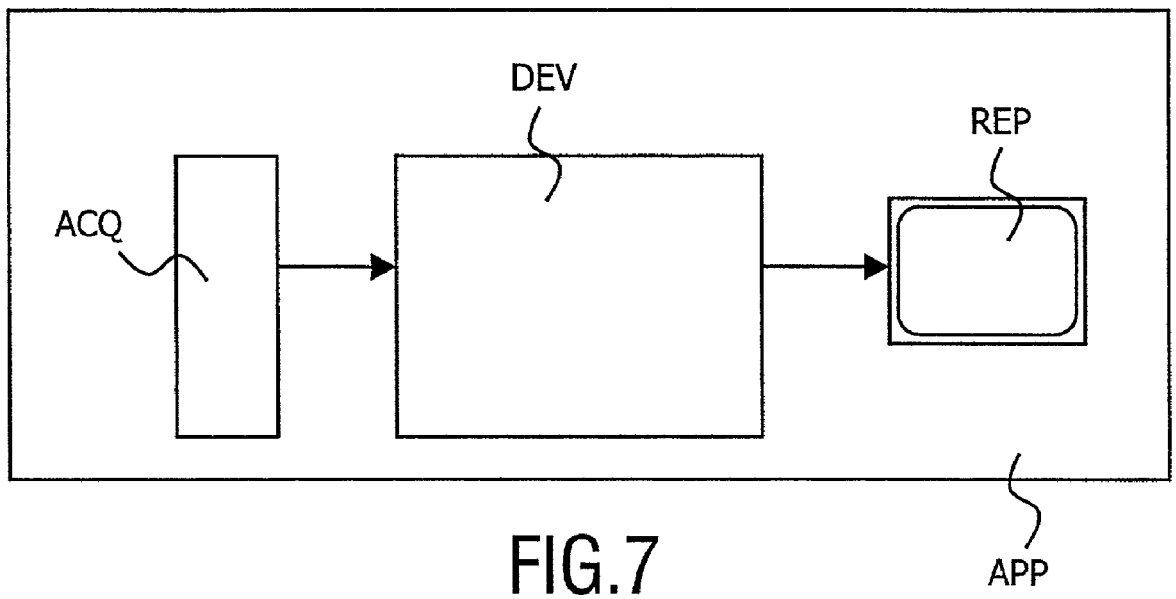

The invention will be further described with reference to examples of embodiments shown in the drawings to which, however, the invention is not restricted:

FIG. 1 depicts a diagram of an image processing method according to the invention, FIG. 2 presents a CSPAMM image of a heart, said image belonging to a sequence of images and being taken after the magnetization pulse, FIG. 3 illustrates a first embodiment of the invention, FIG. 4 illustrates a second embodiment of the invention, FIG. 5 depicts an image processing device according to a particular embodiment of the invention, FIGS. 6a, 6b, 6c and 6d depict the deformation of a structure per unit length respectively without correction of the global movement, with correction of the global translation, with correction of global translation and rotation and with correction of global translation, rotation and contraction, FIG. 7 depicts an image capture and processing apparatus according to the invention.

DETAILED DESCRIPTION OF THE PREFERRED EMBODIMENTS

FIG. 1 depicts a diagram of an image processing method according to the invention. Said method is applicable to images belonging to an image sequence of at least two images IM(t1) and IM(t2) taken at two times t1 and t2 of an organ or part of an organ made to deform over time. Said organ or said part of the organ is visible on the images in the form of a surface called the surface of the organ. The surface of the organ includes characteristic points whose correspondences are determined from one image to another in the sequence. Said characteristic points are denoted marking points. Said organ or part of organ may, for example, be marked by magnetic resonance spatial modulation. Hereinafter, the invention is described more particularly in the case of such a marking by magnetic resonance spatial modulation.

The technique of marking by magnetic resonance spatial modulation includes in particular the SPAMM and CSPAMM techniques for obtaining images where the marking is visible on the images as marking lines which can have different geometries when they are generated in the organ (straight lines, curves etc). Said marking lines deform whilst following the physical deformation of the organ. In the images obtained by means of the techniques mentioned above, the lines corresponding to the spatial magnetization minima are dark lines and can easily be located.

In using magnetic resonance spatial modulation, generally a series of images of the organ marked at successive and regular times are taken. These series of images are called image sequences and the deformation of the organ is observed by means of the deformation of the marking lines which constitute a sort of frame attached to the organ. Said frame can have various appearances: parallel straight lines, grid consisting of straight lines in two directions etc. A technique called "slice following" makes it possible to follow the deformation of a section of the organ even if the plane of this section moves in a direction substantially perpendicular to this plane during the sequence.

In the case of a periodic deformation of the organ, several image sequences of the same organ taken for successive similar deformations show the same deformation on each similar image, that is to say sampled at the same time within the deformation period. In this case, the similar images can be combined so that the frames of two images are visible on the new image resulting from the combination. In this way a new sequence of images is defined by effecting this combination on all the images in the sequence. This new sequence in general contains more information than the more simple original sequences.

According to the sequence acquisition times, which depend on the marking chosen, it may be advantageous either to work on a single sequence of images of the organ marked with complex marking, or to work on a combination of several image sequences (generally two) of the organ each time marked with a simple marking, said combination defining a new sequence then used in the image processing method according to the invention.

FIG. 2 presents an image of a heart, said image belonging to a sequence of images and being taken approximately 9 ms after the magnetization pulse. Two sets of parallel lines corresponding to light intensity minima are observed, the parallel lines in one set being perpendicular to the parallel lines in the other set. The image sequence from which this example is drawn thus has marking lines in two distinct directions and can thus be the result either of a direct capture of a sequence of images of the organ marked in both directions, or of the combination of two captures of sequences, each of the two sequences being marked in one of the two directions.

Two types of marking line can be used in a method according to the invention. In FIG. 2, the marking lines corresponding to intensity minima, that is to say magnetic resonance minima, can easily be located. The marking lines corresponding to intensity maxima and corresponding to magnetic resonance maxima are however also detectable, even if they are less easy to detect. For example, by derivation from the image intensity profile it is possible to locate the lines corresponding to the magnetization maxima. The use of these two types of marking lines increases the information on the image since the marking frame is closer together: the number of points of intersection between marking lines and therefore the number of marking points is greater.

With regard to the quality of the images of a sequence, the CSPAMM technique makes it possible in particular to obtain a persistent contrast on a sequence. This is in particular useful in the case where the marking lines corresponding to the magnetic resonance maxima are used, the persistent contrast aiding in the locating of the intensity minima.

The image processing method according to the invention processes the images where marking points are present for which it is possible to establish correspondences from one image to another. In the case of magnetic resonance spatial modulation, the marking lines are such that there exist points of intersection between several marking lines. It is easy to establish correspondences from one image to another for these points of intersection, which are hereinafter called marking points MP. They can be points of intersection between marking lines of any form and can be directly visible on the marking frame or be visible only after a combination of several sequences, giving a new image sequence.

The method according to the invention includes a step DEF of defining, on an image IM($t_1$) a structure per unit length LS($t_1$). In the application of the method in an image processing device according to the invention, this step may for example be performed manually by the user or automatically on any image in the sequence. This image IM(t1) can be chosen at any time t1 in the sequence since the deformations observed from one image to another may, once determined, be applied indifferently in the chronological direction or in the opposite direction simply by reversing deformations. Where the structure per unit length makes it possible to follow the deformation of a wall of the organ being observed, the image will advantageously be chosen as being the one where said wall is the most visible; the practitioner can, in this case, define the structure per unit length simply by visually following the contour on the image.

The method according to the invention includes a step CALC of calculating the positions of the marking points. This can, in the example of magnetic resonance spatial modulation, be effected by using the method described in the patent application included by reference: No 00403028.4 of 31 Oct. 2000. In this patent application, candidate points for belonging to a given marking line are detected before means of predicting the movement of the marking line are used for identifying the marking line and the points belonging to it and an equation for the line is calculated. Once the equations for the marking lines have been determined, calculating the positions of the marking points is easy. The marking points MP(t1) and MP(t2) are the points for which a correspondence is established from an image IM(t1) to the image IM(t2), the two times t1 and t2 being able to be successive or not in the image sequence and t1 being able to be after or before t2.

The method according to the invention next includes a step DET of determining a mathematical expression f of the deformation of the organ or of the part of the organ observed between the image IM(t1) and IM(t2) from a set MP' of marking points.

A first embodiment of the determination step DET is illustrated in FIG. 3. FIG. 3 depicts an image IM in which the positions of the marking points MP are calculated. The mathematical expression f of the deformation of the organ or of the part of the organ observed between this image and a second image is determined for all points on a surface S including the structure per unit length LS from the positions on the two images of a set of marking points MP', said set of marking points MP' being, in this example, the set of marking points present on said surface S. The structure LS being included in the surface S, the deformation of the structure per unit length LS from this image to the second is obtained by applying the mathematical expression f to LS.

In this first embodiment, the mathematical expression is determined over the entire surface S.

A second, more precise, embodiment of the determination step DET is illustrated in FIG. 4. FIG. 4 depicts an image IM on which the positions of the marking points MP are calculated. The mathematical expression f of the deformation f of the organ or of the part of the organ observed between the two images is determined solely for the points on the structure per unit length LS from the positions on the two images of a set of marking points MP', said marking points MP' being some of the marking points MP or all these marking points MP weighted according to their distance with respect to the structure per unit length LS. The weight $\alpha_i$ allocated to a point i belonging to the set of marking points MP' is the greater, the closer the marking point is to the structure per unit length LS. For example the weight $\alpha_i$ can be of the form:

$$\alpha_i = \frac{1}{(distance(point\, i;\, LS))^2}.$$

The parameters of the mathematical expression f are generally determined by least squares approximation, using or not a weighting of the points according to the embodiment. In the case of weighted points, the least squares approximation amounts to seeking the function f effecting:

$$Inf\left(\sum_{MP'} \alpha_i (f(point\, i(t1)) - point\, i(t2))^2\right).$$

This approximation is carried out from positions of the marking points whose positions are known in the two images and therefore whose movement is known between t1 and t2, referring once again to FIG. 1. Using a weighting of the marking points MP', the regularization will thus be better close to the structure per unit length. The mathematical expression can, for example, be a similarity which takes account of the rigid deformations.

In a particular embodiment, the mathematical expression of the deformation is defined in the complex plane. The deformation can be defined in a polar reference frame. In the particular case in which the organ is a heart, it is easy to define a center positioned approximately at the center of gravity of the surface of the organ as seen on the image.

In the preferred embodiment of the invention, the mathematical expression is derived from a similarity which can be written in a form relating to a point o chosen in any way, but generally chosen as being approximately the center of gravity of the surface observed:

$$f(z)=|z-o|(ae^{i\theta})+d, \theta=arg(z-o).$$

The expression of the similarity is modified by introducing a Fourier series into the expression in order to take account of deformations which are more elastic than a simple similarity:

$$f(z) = |z - o| \underbrace{\left(\sum_{\substack{k=-N \\ k \neq 0}}^{N} a_k e^{ik\theta}\right)}_{f_o(\theta)} + d,\; \theta = \arg(z - o),\; (a_k) \in C^{2N+1}$$

This expression takes account of a global semi-elastic deformation in a centered reference frame. It is defined by 2×(2N+1)+2 real parameters which are defined from marking points in the set MP'. These parameters are in general overevaluated since there are more marking points in MP' than parameters. This is particularly the case when the marking lines corresponding to the magnetic resonance maxima are used, the number of points of intersection between the lines then being great. The overevaluation of the parameters smoothes the noise.

In the case of the heart, the endocardium is notably more contractile than the epicardium and consequently, the closer the center of the myocardium is approached, the greater the magnitude of the radial movement is. A corrective term which is a function of the radius and the polar angle is advantageously added a posteriori to the determination of the explicit mathematical expression f in order to add a radius dependency. This corrective term is also determined using the positions of the marking points MP' on the two images, but this determination is effected after the determination of the parameters $a_k$ of the deformation f(z).

In one advantageous embodiment, the corrective term is defined by angular sectors s of the image and is of the form:

$$\gamma(r, \theta) = \sum_s \left(\gamma_s(r) \frac{\prod_{k \neq s}(\theta - \theta_k)}{\prod_{k \neq s}(\theta_s - \theta_k)}\right).$$

The term $\gamma_s(r)$ is a polynomial in r independent of θ defined on the angular sector s of the image according to the positions of the marking points on the angular sector s of the two images. The Lagrangian polynomial interpolator is then used to take account of the dependency in θ, $θ_s$ being the center angle of the angular sector s. If the corrective term were determined at the same time as the function f there would exist a multiplicity of writing of the set except if the function f were constrained. However, f gives a mathematical expression of the global deformation. The corrective term represents the physiological behavior and not the kinematic deformation. Globally, the elasticity of the mathematical expression is controlled by the choice of N, Fourier order (N=3 is generally sufficient) and, in the case where the corrective term is introduced, by the number of angular sectors considered for the approximation of the corrective term and the choice of the degree of the polynomial $γ_s$.

In the second embodiment of the determination step, it is possible to have a very precise determination of the deformation by firstly applying a step of determining a mathematical expression according to the first embodiment, that is to say on a surface, using a corrective term. This corrective term, once determined, is then used in the step of determining the mathematical expression determined solely on the structure per unit length. The two embodiments can thus be implemented independently or be combined in order to obtain supplementary data or better precision.

FIG. 5 depicts image processing equipment DEV according to a particular embodiment of the invention. This equipment DEV is in relationship with means ACQ of acquiring sequences SIM of X images. This equipment DEV includes means DEF of defining a structure per unit length $LS(t_j)$ on an image $IM(t_j)$. This equipment DEV includes means CALC of calculating the positions of the marking points on two images, successive or not, and means DET of determining parameters of an explicit mathematical expression of the deformation of the organ or part of the organ observed between the two images from positions of a set of marking points on the two images, said mathematical expression being at least determined for the points on the structure per unit length. In the particular embodiment depicted in FIG. 5, the method described in FIG. 1 for two images, successive or not, is iterated on the set of successive images $IM(t_i)$ of the image sequence SIM.

As the structure per unit length is defined on an image $IM(t_j)$ of the sequence which is most often different from $IM(t_0)$, the processing of the images cannot be carried out from $t_0$ directly. It is necessary to reorder the sequence SIM so as to commence processing the image where the structure per unit length is defined first, even if it means then re-establishing the original order for presenting the results. The deformations can in fact be calculated between any two images. The use of a memory MEM also makes it possible to store the expressions of the deformations in order then to reuse them. For example, it is possible to combine together the expressions of the deformations of successive images in order to find the deformation between two non-successive images.

After an initialization for a counter initialized to i=0, the image $IM(t_j=t_0)$ is extracted from the sequence SIM. The positions of the marking points $MP(t_j=t_0)$ are calculated and stored in the memory MEM, and the process described below is initiated with i=1. This initialization is not explicitly depicted in the Figure since it is the particular case of the general scheme where i=0, where f is a zero function and $MP(t_{i-1})=MP(t_j=t_0)$. An image $IM(t_i)$ is extracted from the a priori reordered sequence of images SIM. The positions of the marking points $MP(t_i)$ are calculated by the calculation means CALC. These positions are stored in a memory MEM and are supplied to means DET of determining a mathematical expression of the deformation. The positions of a set of marking points $MP'(t_{i-1})$ of the previous image $IM(t_{i-1})$ are extracted from the memory MEM and supplied to the means DET for the determination of the expression of the deformation $f(t_{i-1}/t_i)$.

In the embodiment depicted in FIG. 5, the mathematical expression of the deformation is then stored in the memory MEM and a counter is incremented to i=i+1. The deformation $f(t_{i-1}/t_i)$ is used with $LS(t_{i-1})$ in means AP of applying the mathematical expression of the deformation to $LS(t_{i-1})$ in order to determine $LS(t_i)$ which is stored in the memory MEM and can be depicted on the image $IM(t_i)$.

FIG. 6 illustrates a last improvement of the following of the deformation of a structure per unit length defined on an image including marking points. In an advantageous embodiment, the global movements of the structure per unit length are in fact calculated and then extracted from the expression applied to the structure per unit length. FIG. 6 depicts the deformation of the structure per unit length by depicting two structures per unit length: a first structure LS(t1) corresponding to the structure on a given image and a second structure LS(t2) which has undergone the deformation of the organ between times t1 and t2. The specific movement of twelve points is represented by lines, such as the line L connecting the corresponding points on one structure to the other. In FIG. 6a, no correction is made, in FIG. 6b a correction of the global translation of the structure per unit length is applied, in FIG. 6c a correction of the global rotation is applied in addition to the translation correction, in FIG. 6d a contraction correction is applied in addition. The resulting figure gives information on the particular local deformation of the organ; this is information which makes it possible to detect any abnormalities in the behavior of the organ.

FIG. 7 depicts an image capture apparatus APP, said apparatus comprising means ACQ of acquiring sequences of at least two images of an organ or part of an organ caused to deform over time, said organ or said part of an organ being visible in the images in the form of a surface called the surface of the organ, said surface including characteristic points whose correspondences are determined from one image to another in the sequence, means REP of visual representation of these images being able to comprise a video mode for following the deformation during the sequence, an image processing device DEV as described previously.

The drawings and their description herein before illustrate rather than limit the invention because there are numerous ways of implementing functions by means of hardware or software, or both. In this respect, the drawings are very diagrammatic, each representing only one possible embodiment of the invention. Thus although a drawing shows different functions as different blocks, this by no means excludes that a single item of hardware carries out several functions. Nor does this exclude that a function is carried out by an assembly of items of hardware or software, or both. Any reference sign in a claim should not be constructed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A method of processing images belonging to a sequence of at least two images having a surface representing an organ or part of an organ which is deformable over time and called the organ surface, said surface including characteristic points, denoted marking points, which correspond from one image to another in the sequence, said method comprising steps of:

defining a structure per unit length on one of the images of the sequence, calculating the positions of the marking points on at least two images, successive or not, determining the parameters of an explicit mathematical expression of the deformation of the organ or part of the organ observed between the two images, from the positions of a set of marking points on the two images and the positions of the points of the structure per unit length, applying said explicit mathematical expression to the structure per unit length in order to define the form of the structure per unit length after deformation of the organ between the two images.

2. An image processing method as claimed in claim 1, characterized in that said organ is marked by magnetic resonance spatial modulation, said marking being visible on the images in the form of marking lines, said marking lines deforming according to the deformation of the organ and being such that there exist points of intersection between said marking lines, said points of intersection being the marking points.

3. An image processing method as claimed in claim 1, wherein the structure per unit length defines a segmentation of the image, said segmentation thus being followed from one image to the other.

4. An image processing method as claimed in claim 1, wherein the mathematical expression of the deformation of the organ or part of the organ observed between the two images is determined for a surface including the structure per unit length from positions on the two images of a set of marking points, said set of marking points containing at least the marking points present on said surface.

5. An image processing method as claimed in claim 1, wherein the mathematical expression of the deformation of the organ or part of the organ observed between the two images is determined solely for the points on the structure per unit length from positions on the two images of a set of marking points, said marking points being weighted according to their distance with respect to the structure per unit length.

6. An image processing method as claimed in claim 1, including a step of determining one or more global movements of the structure per unit length, said global movements being extracted from the mathematical expression of the deformation and a step of subtraction of these global movements from the mathematical expression of the deformation applied to the structure per unit length.

7. Computer readable medium for storing a set of computer-readable instructions that upon execution by a computer, execute the method of processing images as set forth in claim 1.

8. Image processing device, having means for receiving or generating images, said images belonging to a sequence of at least two images having a surface representing an organ or part of an organ deformable over time and called the organ surface, said surface including characteristic points, denoted marking points, which correspond to each other from one image to another in the sequence, said device comprising means of:

defining a structure per unit length on one of the images of the sequence, calculating the positions of the marking points on at least two images, successive or not, determining the parameters of an explicit mathematical expression of the deformation of the organ or pad of the organ observed between the two images, from the positions of a set of marking points on the two images and the positions of the points of the structure per unit length, applying said explicit mathematical expression to the structure per unit length in order to define the form of the structure per unit length after deformation of the organ between the two images.

9. Image processing device as claimed in claim 8, characterized in that said organ is marked by magnetic resonance spatial modulation, said marking being visible on the images in the form of marking lines, said marking lines deforming whilst following the deformation of the organ and being such that there exist points of intersection between said marking lines, said points of intersection being the marking points.

10. Image processing device as claimed in claim 8, comprising a step of determining one or more global movements of the structure per unit length, said global movements being extracted from the mathematical expression of the deformation and a step of subtracting these global movements from the mathematical expression of the deformation applied to the structure per unit length.

11. Image processing device as claimed in claim 7, comprising means of displaying the changes in the parameters of the deformation undergone by the structure per unit length during the sequence.

12. Image processing device as claimed in claim 8, wherein said structure per unit length is a structure per unit length defined by the user on one of the images in the sequence and in that the deformation is followed on all the images in the sequence.

13. Magnetic resonance image capture apparatus comprising:

means of acquiring magnetic resonance images for obtaining a sequence of images, means for the visual presentation of these images, and image processing equipment as claimed in claim 8.

* * * * *